(12) United States Patent
Grimes et al.

(10) Patent No.: US 9,916,000 B2
(45) Date of Patent: Mar. 13, 2018

(54) POWER PROTECTION AND REMEDIATION

(71) Applicant: I-EWM Acquisition, LLC, Atlanta, GA (US)

(72) Inventors: Benjamin Grimes, Atlanta, GA (US); Vincent Luciani, Atlanta, GA (US)

(73) Assignee: I-EWM Acquisition, LLC, Atlanta, GA (US)

( * ) Notice: Subject to any disclaimer, the term of this patent is extended or adjusted under 35 U.S.C. 154(b) by 0 days.

(21) Appl. No.: 14/942,427

(22) Filed: Nov. 16, 2015

(65) Prior Publication Data

US 2017/0139466 A1    May 18, 2017

(51) Int. Cl.
| | |
|---|---|
| *G06F 1/30* | (2006.01) |
| *G06F 1/32* | (2006.01) |
| *G06F 1/28* | (2006.01) |
| *H02J 3/00* | (2006.01) |
| *G06F 1/26* | (2006.01) |

(52) U.S. Cl.
CPC .......... *G06F 1/3287* (2013.01); *G06F 1/266* (2013.01); *G06F 1/28* (2013.01); *G06F 1/30* (2013.01); *G06F 1/3206* (2013.01); *G06F 1/3209* (2013.01); *H02J 3/00* (2013.01)

(58) Field of Classification Search
CPC ...................................... G06F 1/28; G06F 1/30
See application file for complete search history.

(56) References Cited

U.S. PATENT DOCUMENTS

| | | | | |
|---|---|---|---|---|
| 5,801,952 | A * | 9/1998 | Moore | G01R 31/42 |
| | | | | 324/102 |
| 6,112,136 | A * | 8/2000 | Paul | G01R 19/2513 |
| | | | | 700/293 |
| 7,206,670 | B2 | 4/2007 | Pimputkar et al. | |
| 7,532,956 | B1 * | 5/2009 | Pelaez, Jr. | H02J 1/14 |
| | | | | 361/87 |
| 8,094,034 | B2 | 1/2012 | Patel et al. | |
| 8,315,745 | B2 | 11/2012 | Creed | |
| 8,560,134 | B1 * | 10/2013 | Lee | H02J 13/0086 |
| | | | | 700/28 |

(Continued)

FOREIGN PATENT DOCUMENTS

WO    2014153151    9/2014

OTHER PUBLICATIONS

Authorized officer Blaine R. Copenheaver, International Search Report/Written Opinion in PCT/US2016/051302 dated Jan. 6, 2017, 29 pages.

*Primary Examiner* — Thomas Lee
*Assistant Examiner* — Gary Collins
(74) *Attorney, Agent, or Firm* — Smith Gambrell & Russell LLP

(57) ABSTRACT

Methods, systems, and apparatus for collect historical power consumption data and power consumption statistics for one or more locations and devices at the location to generate historical power consumption and health data ("historical data"). The historical data are used to develop and provide multiple different protection and monitoring functions. The system may be deployed within a single customer location, e.g., within a building or a plant, and local analytics are developed at the location. Alternatively, the system may be distributed among several locations for a particular customer or multiple different customers and include cloud-based analytics in addition to, or instead of, local analytics.

16 Claims, 8 Drawing Sheets

(56) References Cited

U.S. PATENT DOCUMENTS

| | | | |
|---|---|---|---|
| 8,712,732 B2 | 4/2014 | Patel et al. | |
| 8,892,266 B2* | 11/2014 | Rossi | H02J 3/14 700/291 |
| 9,146,548 B2 | 9/2015 | Chambers et al. | |
| 2002/0101695 A1* | 8/2002 | Saksa | H02H 3/006 361/64 |
| 2003/0016004 A1 | 1/2003 | Jungwirth | |
| 2003/0095367 A1 | 5/2003 | Mares et al. | |
| 2004/0075343 A1 | 4/2004 | Wareham et al. | |
| 2005/0097373 A1* | 5/2005 | Stoupis | H02J 13/001 713/300 |
| 2005/0273280 A1* | 12/2005 | Cox | G01R 21/133 702/60 |
| 2006/0116794 A1* | 6/2006 | Stoupis | H02J 13/001 700/286 |
| 2006/0271214 A1* | 11/2006 | Brown | A61B 5/0002 700/90 |
| 2008/0019067 A1* | 1/2008 | Reynolds | G06F 1/266 361/93.1 |
| 2008/0103732 A1* | 5/2008 | Stoupis | G05B 23/0221 702/188 |
| 2008/0172312 A1 | 7/2008 | Synesiou et al. | |
| 2008/0201020 A1* | 8/2008 | Scholtz | H02H 3/006 700/291 |
| 2009/0066528 A1* | 3/2009 | Bickel | G01D 4/004 340/657 |
| 2009/0109021 A1 | 4/2009 | Paoletti | |
| 2009/0187344 A1 | 7/2009 | Brancaccio | |
| 2009/0251002 A1* | 10/2009 | Cohen | G06F 1/30 307/23 |
| 2010/0167659 A1* | 7/2010 | Wagner | G01D 4/008 455/67.11 |
| 2011/0166719 A1* | 7/2011 | Pasek | G01D 4/00 700/291 |
| 2011/0301894 A1* | 12/2011 | Sanderford, Jr. | G01D 4/004 702/65 |
| 2012/0130658 A1* | 5/2012 | Dawley | H01R 13/66 702/62 |
| 2012/0290230 A1* | 11/2012 | Berges Gonzalez | G01D 4/004 702/61 |
| 2013/0035802 A1 | 2/2013 | Khaitan et al. | |
| 2013/0103219 A1* | 4/2013 | Anderson | H02H 1/0092 700/292 |
| 2013/0110621 A1* | 5/2013 | Gupta | G01R 31/34 705/14.52 |
| 2013/0138669 A1* | 5/2013 | Lu | G06N 3/088 707/758 |
| 2013/0238266 A1* | 9/2013 | Savvides | G06Q 50/06 702/61 |
| 2014/0018969 A1 | 1/2014 | Forbes | |
| 2014/0108851 A1* | 4/2014 | Ishchenko | G06F 11/07 714/2 |
| 2014/0268458 A1 | 9/2014 | Luciani | |
| 2014/0350873 A1* | 11/2014 | Litzinger | G01R 21/133 702/60 |
| 2014/0358456 A1* | 12/2014 | Du | G01R 21/06 702/60 |
| 2015/0012147 A1* | 1/2015 | Haghighat-Kashani | G06Q 30/02 700/291 |
| 2016/0164288 A1* | 6/2016 | Yang | H02J 3/14 307/31 |
| 2017/0131732 A1 | 5/2017 | Dawley et al. | |

* cited by examiner

POWER PROTECTION AND REMEDIATION

TECHNICAL FIELD

This document relates to facilitating power management and protection.

BACKGROUND

Modern electronic equipment is sensitive to power disturbances on the power grid. Protection systems designed to isolate electronic devices from such disturbances are often used to protect sensitive electronic devices. While such systems work well for grid disturbances, they do not otherwise address the underlying cause of such disturbances, many of which may be local to a location and not caused by a failure external to the location.

The problems caused by these disturbances are widespread and multifaceted. Entire organizations, e.g., maintenance and repair shops, exist largely because of them. Organizations affected by power disturbances suffer lost revenue, repair costs, and maintenance overhead. Common issues include premature equipment failure, induced errors, revenue loss, and truck rolls.

With respect to premature equipment failure, the resulting damage from repeated exposure to these disturbances wears out and damages the component parts of the electronic equipment. These parts need to be replaced, typically by trained and experienced technicians, at considerable expense. Most modern electronic equipment is made of multiple components that need to operate in a reliable, synchronized manner. If one or more of the components fails to do so, the typical result is an error code and the temporary or permanent unavailability of the equipment. This, in turn, leads to down time in an organization and lost revenue.

Finally, a truck roll occurs when a technician has to be dispatched to the equipment in order to diagnose and address the issue. Often the technician is encountered with mysterious 'No Fault Found' error codes. The fix typically is something as simple as a power cycle (momentarily cutting the power to the equipment) and allowing the device to reboot. However, the cost of the technician's time and associated overhead (truck, fuel, maintenance, dispatch, et.) can easily exceed several hundred dollars. Furthermore, if there is a systemic grid problem within a location, it may be very difficult, if not impossible, for the service technician to identify and diagnose.

Finally, the systems described above are often reactive in that they take protective measures after detection or commensurate with the detection of a fault, such as a voltage sag or current inrush, and are not designed to anticipate the need for taking a protective measure before a fault condition occurs.

Accordingly, there is a need for proactive protection processes and systems that in addition to protecting equipment from disturbances, utilizes historical data to detect one or more of systemic topology problems, anticipate equipment failure, and adjust protection schemes on a per-device basis.

SUMMARY

In general, one innovative aspect of the subject matter described in this specification can be embodied in methods that include the actions of, for a power customer location that receives power from a power source, the power customer location including a plurality of electrical loads: receiving by a data processing apparatus and during a reporting time period, reporting data from each of a plurality of power management devices, each power management device coupled to a respective one of the electrical loads and providing power management for the electrical load, wherein for each power management device the reporting data includes: power characteristics as detected at the electrical load, a time at which the power characteristics were detected; determining, by the data processing apparatus, from the reporting data and for each electrical load to which a power management device is coupled, a sensitivity profile for the electrical load that characterizes the ability of the electrical load to maintain an operable state in the event of input power to the electrical load deviating from a nominal specification; and generating, by the data processing apparatus, for each power management device of two or more power management devices, a load-specific protection specification for the power management device based on the sensitivity profile of the electrical load that is coupled to the power management device, wherein the load-specific protection specification is different from a load-specific protection specification for anther power management device. Other embodiments of this aspect include corresponding systems, apparatus, and computer programs, configured to perform the actions of the methods, encoded on computer storage devices.

Another innovative aspect of the subject matter described in this specification can be embodied in methods that include the actions of: for a power customer location that receives power from a power source, the power customer location including a plurality of electrical loads: receiving, by a data processing apparatus, reporting data from each of a plurality of power management devices, each power management device coupled to a respective one of the electrical loads and providing power management for the electrical load, wherein for each power management device the reporting data includes: power characteristics as detected at the electrical load, and a time at which the power characteristics were detected; determining, by the data processing apparatus and from the reporting data, historical power characteristics for each electrical load indicative of power consumption when input power is within a nominal specification; determining, based on the historical power characteristic, that an electrical load operation in a healthy state for a power management device is consuming power at a consumption level that is a precursor indicator of a malfunction state of the electrical load; and generating, in response to the determination, an alert that describes that the electrical load of the load point may be experiencing a malfunction. Other embodiments of this aspect include corresponding systems, apparatus, and computer programs, configured to perform the actions of the methods, encoded on computer storage devices.

Another innovative aspect of the subject matter described in this specification can be embodied in methods that include the actions of: for a power customer location that receives power from a power source, the power customer location including a plurality of local distribution branches and wherein each local distribution branch includes a plurality of electrical loads: receiving reporting data from each of a plurality of power management devices, each power management device coupled to a respective one of the electrical loads and providing power management for the electrical load, wherein for each power management device the reporting data includes: power characteristics as detected at an electrical load on the distribution branch, and a time at which the power characteristics were detected; determining, from the reporting data, a historical power environment profile for the customer location that describes historical power characteristics for each of the electrical loads on the distribution branches; determining, based on the historical power environment profile, a combination of electrical loads that results in at least a first electrical load operating in a healthy state inducing power-related malfunctions in at least a second electrical load; and generating, in response to the determination, an alert that describes the combination of electrical loads. Other embodiments of this aspect include corresponding systems, apparatus, and computer programs, configured to perform the actions of the methods, encoded on computer storage devices.

Another innovative aspect of the subject matter described in this specification can be embodied in methods that include the actions of: for a power customer location that receives power from a power source, the power customer location including a plurality of local distribution branches and wherein each local distribution branch includes a plurality of electrical loads: receiving, during a reporting time period, reporting data from each of a plurality of power management devices, each power management device coupled to a respective one of the electrical loads and providing power management for the electrical load, wherein for each power management device the reporting data includes: power characteristics as detected at electrical load on the distribution branch for the electrical load, and a time at which the power characteristics were detected; determining, from the reporting data, a baseline power environment profile for the customer location that describes power characteristics on the distribution branches; identifying, based on the baseline power environment profile, a distribution branch within the power customer location for which the power characteristics indicate a deviation from the baseline power environment profile for at least a threshold deviation period; and generating an alert that describes the identified distribution branch and the deviation from the baseline power environment profile. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The optimization of protection schemes on a per-device basis can increase uptime for devices that are tolerant of certain power anomalies. This leads to a reduction in system downtime, nuisance trips, and lost revenue.

Detecting malfunctions based on consumption deviations and not resulting from protection circuitry isolating the load allows for proactive detection of possibly failing loads. Such loads can be proactively maintained or replaced, which can eliminate nuisance trips and system failures caused by the failing load.

Detecting combinations of loads that are problematic, e.g., a device that introduces a series of harmonics when performing an operation and that cause failures in another device on the same electrical branch, allows for an organization to isolate the devices from each other. This reduces electrical wear on the device in which failures were induced, thereby extending the device's life. Additionally, such detection and isolation leads to a reduction in system downtime, nuisance trips, and lost revenue.

Detection of toxic environments within the customer location also leads to a reduction in system downtime, nuisance trips, and lost revenue. Portions of a local distribution system, such as a branch within a building, may exhibit a deviation from a baseline power profile. Such a profile may include electrical characteristics, failure and/or warning rates, etc. When a deviation in the branch is detected, the system can issue an alert and technicians can begin analyzing the branch to determine the causes of the deviations and rectify accordingly. Again, such proactive maintenance leads to a reduction in system downtime, nuisance trips, and lost revenue.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Overview

Figure 1:
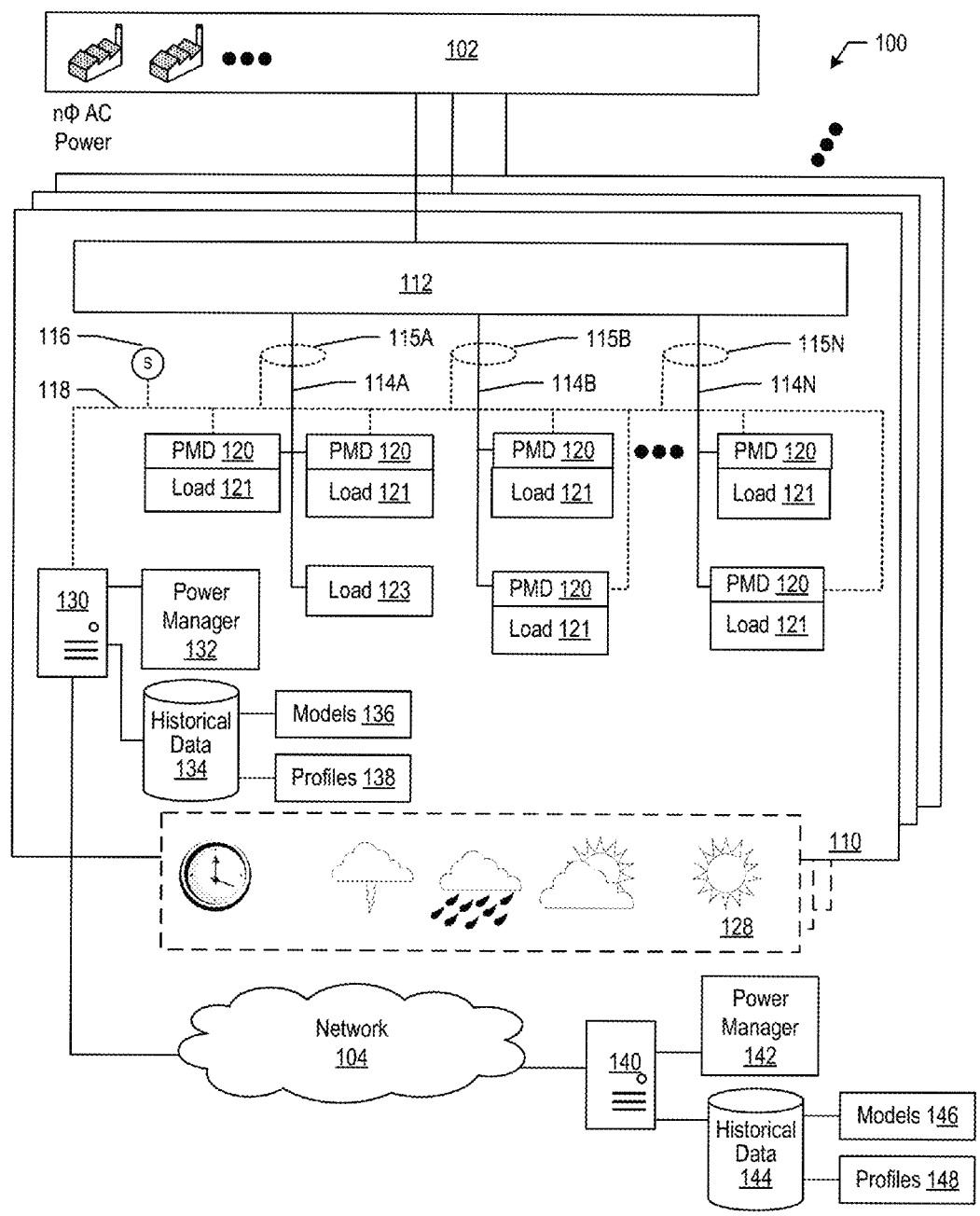
FIG. 1 is a block diagram of an environment which a power protection system may be deployed.

The systems and methods described in this written description collect historical power consumption data and power consumption statistics for one or more locations and devices at the location to generate historical power consumption and health data ("historical data"). The historical data are used to develop and provide multiple different protection and monitoring functions. The system may be deployed within a single customer location, e.g., within a building or a plant, and local analytics are developed at the location. Alternatively, the system may be distributed among several locations for a particular customer or multiple different customers and include cloud-based analytics in addition to, or instead of, local analytics.

In operation, power management devices are distributed in a customer location. The customer location receives power from a power source and includes local distribution branches, each of which has one or more electrical loads. Each power management device is interposed between an electrical outlet and a load, and provides power protection, e.g., voltage and surge protection, undercurrent protection, load fault protection, and so on, with respect to the electrical load.

Each power protection device is also in data communication with a data processing apparatus. The data processing apparatus may be a single computer, or a network of computers, and maybe located locally at the location, or in the cloud. The data processing apparatus receives reporting data from each of the power management devices. The reporting data includes, for each power management device, power characteristics as detected at the electrical load on the distribution branch for the electrical load, and a time at which the power characteristics were detected. The power characteristics may include a voltage level, a current level, lag or lead measures, harmonic detections, or any other data that can be observed and collection at the connection point of the power management device. Furthermore, the power management device may also specify, in the reporting data, the source of the power characteristics, e.g., whether the power characteristics are observed on the distribution branch, or observed on the load connected to the power management device, and whether the load or the distribution branch appears to be the source of any disturbances observed.

The reporting data are used to generate historical data, and from the historical data various models and profiles may be generated. The models may be used to predict certain events that may occur within a location, and the profiles may be used to by the power management devices to modify the requirements for taking a protective action for a particular load connected to a particular power management device. Examples of such use of the historical data include the optimization of protection schemes on a per-device basis, detecting malfunctions based on consumption deviations, detecting combinations of loads that are problematic, and detecting toxic environments within the customer location.

With respect to the optimization of protection, in one implementation, the data processing apparatus determines, from the reporting data and for each electrical load to which a power management device is coupled, a sensitivity profile for the electrical load. The sensitivity profile for each electrical load characterizes the ability of the electrical load to maintain an operable state in the event of input power to the electrical load deviating from a nominal specification. Based on each sensitivity profile, the data processing apparatus generates a load-specific protection specification for the power management device. The load-specific protection specification is optimized according to an optimization constraint for the electrical load.

With respect to detecting malfunctions based on consumption deviations, in one implementation, the data processing apparatus determines, from the reporting data and for each electrical load, historical power characteristics indicative of power consumption when input power is within a nominal specification. Then based on the historical power characteristics, the data processing apparatus can determine whether an electrical load operating in a healthy state for a power management device is consuming power at a consumption level that is a precursor indicator of a malfunction state of the electrical load. If such a determination is made, then the data processing apparatus generates an alert that describes that the electrical load of the load point may be experiencing a malfunction.

With respect to detecting combinations of loads that are problematic, the data processing apparatus determines, from the reporting data, a historical power environment profile for the customer location that describes historical power characteristics for each of the electrical loads on the distribution branches. Based on the historical power environment profile, the data processing apparatus determines a combination of electrical loads of two or more different types that result in at least one of the electrical loads operating in a healthy state inducing power-related malfunctions in at least another electrical load. Upon such a determination, the data processing apparatus generates an alert that describes the combination of electrical loads.

With respect to detecting toxic environments within the customer location, the data processing apparatus determines, from the reporting data, a baseline power environment profile for the customer location that describes power characteristics on the distribution branches. Then the data processing apparatus identifies, based on the baseline power environment profile, a distribution branch within the power customer location for which the power characteristics indicate a deviation from a baseline power environment profile for at least a threshold deviation period. If the data processing apparatus determines that the indicated deviation from the baseline power environment profile is attributed to the electrical loads on the identified distribution branch, the data processing apparatus then generates an alert that describes the identified distribution branch and the deviation from the baseline power environment profile.

The above example implementations are not exhaustive of the various intelligence power protection diagnostics, treatment and immunizations that can be realized. The implementations described above and additional features are described in more detail in the sections that follow.

Example System Implementation

FIG. 1 is a block diagram of an environment 100 which a power protection system may be deployed. The environment 100 includes a power source 102. The power source 102 provides power to one or more customer locations 110. The power source 102 may be a utility grid, or a combination of a utility grid and addition energy sources, such as renewable energy sources.

Each customer location 110 receives one or more phases (nϕ) from the power source 102. For example, a residential customer location or a small office building may have a single phase as mains power, while a larger customer location, such as an industrial plant or large office building, may receive three phase power from the power source 102. Input voltages and input power capacity may vary for each location 110.

Each location receives power from the power source 102 through a main distribution panel 112. Branch circuits 114A . . . N distribute power from the main distribution panel 112 through the location 110. The example distribution system shown in FIG. 1 is a simplified representation, and is not exclusive of additional distribution circuits, such as step down transformers, additional power panels and branch circuits, AC to DC conversion, and so on.

Each branch 114 is connected to power management devices 120, which, in turn, are coupled is to a respective electrical loads 121 and provide power management for the electrical load 121. In addition to various current and voltage protection measures, each power management device 120 can provide one or more of the protection measures described in the sections below. A more detailed description of a power management device 120 is provided with reference to FIG. 2 below.

Each power management device 120 includes a communication subsystem the enables the device 120 to communicate with a data processing apparatus, such as a computer 130. As shown, the computer 130 is located within the location 110. The computer 130 receives reporting data from the power management devices 120 through communication links 118 (which may be wired or wireless) and stores the reporting data as historical data 134. From the historical data 134, the computer 130, executing a power manager process 132, generates various models 136 and/or profiles 138, as will be described in more detail below. The computer 130 may process data for only the location 110, or, alternatively, may process additional data from other locations 110 that are associated with the customer.

In some implementations, the functionality of the computer 130 may be integrated into one of the power management devices 120. In operation, the power management devices 120 may discover each other and select one of the power management devices 120 to act as a master device 120 that incorporates the functions of the computer 130 described below. Any number of appropriate selection algorithms can be used to select the master device 120. One example selection algorithm is a latency algorithm that selects the device 120 with the lowest average latency when communicating with all other devices 120 relative to the average latency determined for each other device 120.

In some implementations, the functionality of the computer 130 can be distributed in the cloud, as indicated by the computer 140 and network 104. When distributed in the cloud, the computer 140 may process data only for the location 110, or, alternatively, may use reporting data from multiple other locations 110 as well. In the case of the latter, resulting models 146 and profiles 148 may be more robust, as the historical data 144 includes data from many different locations, and the power manager process 142 may thus learn the models 146 and profiles 148 from a larger data set.

This historical data 134 (and/or 144) includes power characteristics received from each power management device 120. The power characteristics may include, for each data set reported, a voltage level, a current level, lag or lead measures, harmonic detections, or any other data that can be observed and collected at the connection point of the power management device 120.

Figure 2:
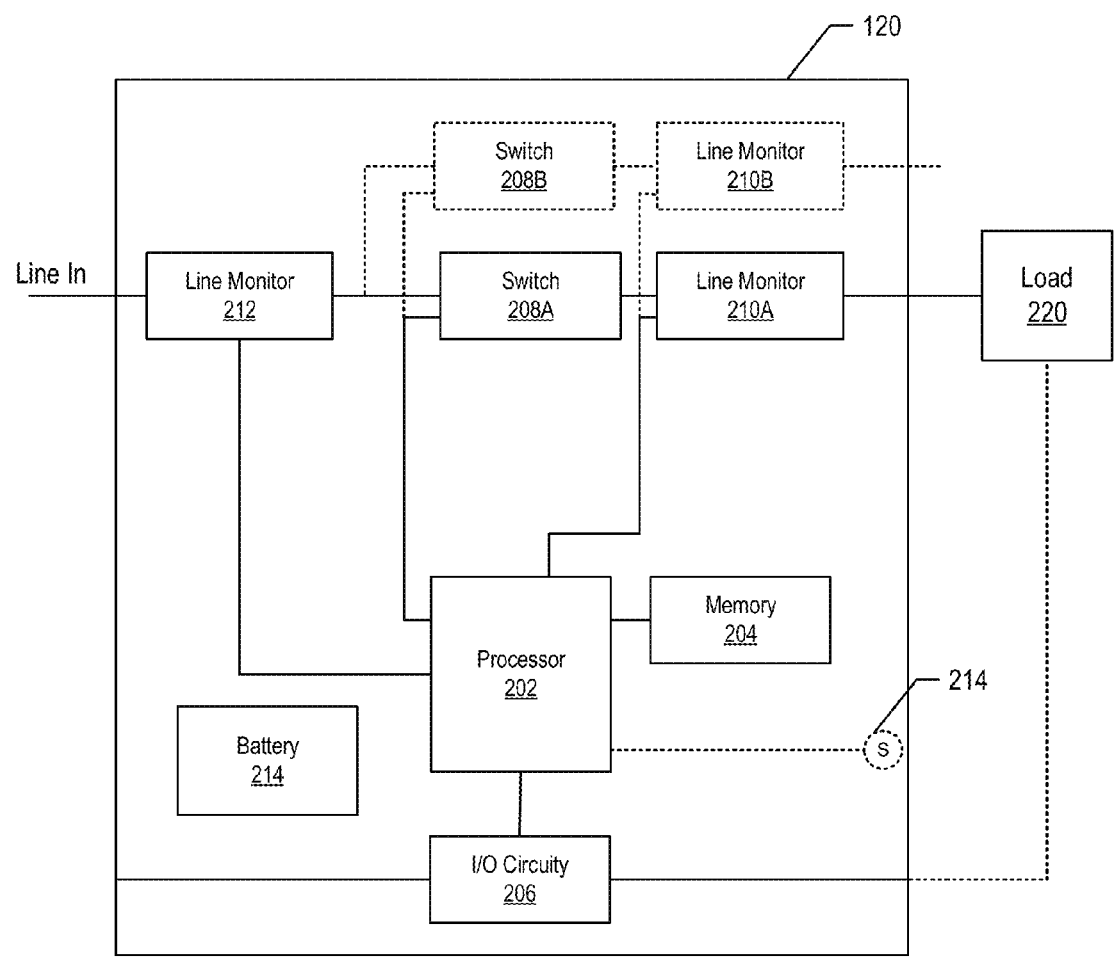
FIG. 2 is a block diagram of an example power management device.

Reporting capabilities of each power management device 120 are further described with reference to FIG. 2, which is a block diagram of an example power management device 120. In the example implementation show in FIG. 2, the power management device includes a processor 202, a memory 204, and I/O circuitry 206. The memory 204 stores models 136 and profiles 138 that are provided from the power manager process 132. The processor 202 performs operations pursuant to the models 136 and profiles 138 stored in the memory 204 and that are responsive to measurements detected by line monitors 210 and 212.

The line monitors 210 monitor power characteristics, e.g., voltage, current, harmonics, etc., as seen at each load 220 that is connected to the power management device 120. Likewise, the line monitor 212 monitors power characteristics, e.g., voltage, current, harmonics, etc., as seen at outlet of the branch to which the power management device 120 is connected. The power management device 120 may also specify, in the reporting data, the source of the power characteristics, e.g., whether the power characteristics are observed on the distribution branch by line monitor 212, or observed on the load connected to the power management device by line monitor 210, and whether the load or the distribution branch appears to be the source of any disturbances observed. For example, if the data received from the line monitors 210 and 212 indicate that there is a current inrush that is followed by a voltage sag, then the processor 202 may determine that the load 220 is the cause of the disturbance. Conversely, if the data received from the line monitors 210 and 212 indicate that there is a voltage sag followed by a current rush, then the processor 202 may determine that the cause of the disturbance is external to the load 220, e.g., from a disturbance that is received from the distribution branch 114 to which the power management device is connected.

In some implementations, the power management device 120 may identify the types of electrical loads 121 that are connected to it. The electrical load 121 may be manually identified to the power management device 120 by a system administrator through a user interface served by the computer 130, or may be detected automatically, such as by use of a Machine Information Byte (MIB) received over the connection between the I/O circuitry 206 and the load 220.

In other implementations, the power management device 120 may include profile data that specifies observed power characteristics that are indicative of certain loads to generate equipment fingerprints. The observed power characteristics can be learned from the historical data 134 and/or 144 by any appropriate machine learning process that can model and identify information bearing signals emergent from large data sets. For example, from the historical data 144, the power manager process 142 may determine that several instances of a particular load type have been identified to power management devices 120. Assume that the particular load type is a particular model of a photocopy machine. The power manager 142 may process the reporting data for each instance of the particular model of the photocopy machine received from multiple locations. Power characteristics that are unique and consistent to the particular model of the photocopy machine are then detected and stored as a profile unique to that device. The power characteristics must be unique so that they may be used to identify the particular device, and must be consistent across the reporting data for the devices. In the case of the latter, for example, some devices may have faulty or failing equipment, resulting in power characteristics that are inconsistent relative to the entire set of identified devices. Such inconsistent data are not used for equipment fingerprinting.

Once generated, the profile may be distributed to each power management device 120 so that the device 120 can identify the copier, should the copier be connected to it. The identification may be subject to operator confirmation through a user interface served by the computer 130 or computer 140.

In other implementations, the power manager process 142 may determine multiple instances of unique and consistent power characteristics and generate a profile for an unidentified unique device and distribute the profile to the power management devices. A power management device 120 then identifies the unique device by the observed power characteristics may then send a signal to the computer 130, which, in turn, may cause a user device to prompt an administrator to identify the unique device. Once data is received that identifies the unique device, the data may be distributed locally to other power management devices 120 in the location 110, and may also be communicated to the cloud computer 140. Once received in the cloud, the profiles 148 may be updated and distributed to other power management devices 120 at other locations. In this way, electrical loads that do not have the capability to identify themselves to the power management devices 120 may nevertheless be discovered and identified by means of signal analysis and user identification.

Reporting data may also include sensor data from sensor(s) 214. The sensors data may include temperature and humidity, for example, which may also be used to model disturbances and particular loads.

The processor 202 drives switches 208 in response to observed power characteristics, models 136, and profiles 138. As will be described in more detail below, the use of the models 136 and profiles 138 facilitates multiple different proactive protection and management schemes.

A battery device 214 may be included in the power management device 120 to provide power to the device 120 in the event of an outage. By use of the battery device 214, the power management device 120 may still provide reporting data and communicate with other devices.

Returning now to FIG. 1, each location may also have loads 123 that are not connected to power management devices. Thus, in some implementations, power meters 115 may be connected to each branch and the power meter readings may be reported to the computer 130 for processing by the power manager 132. The additional information provided by the power meters 115 can thus be used to model each branch and detect electrical loads on each branch that are not protected by the power management devices 120.

Additionally, sensor data from sensor(s) 116 located throughout the location 110 may report environmental conditions, such as temperature and humidity. The environmental conditions may also be used for modeling and profile generation, as some devices are susceptible to temperature and humidity changes.

Additional data 128 may also be collected by the computer 130, such as the time, date, and weather. The data may be observed by sensors or received from an external service, such as a feed that provides weather-related data, lightning detection, etc. The data 128 may be used to further tune the models 136 and profiles 138, and the data 128 may be provided to the power management devices 120 that are operating according to such models 136 and profiles 138. For example, a particular load 121 may be highly susceptible to power surges, and thus, during lightning events, such as period of a thunderstorm warning, the load 121 may be proactively disconnected from a branch 114 until the thunder storm warning expires.

The distribution topology of the location 110 can, in some implementations, be specified by system administrators. For example, a mapping of the distribution grid within the location may be provided to each power management device 120, and each device 120 may also be provided with information that describes its respective location on the distribution grid. Alternatively, in some implementations, the reporting data provided by the power management devices 120 to the computer 130 may be used to derive the distribution grid. For example, if only a proper subset of power management devices 120 in a location 110 simultaneously experience an outage or a particular disturbance, the power manager 132 may determine that those devices are on a particular branch. Model data 146 describing the topology and device 120 distribution within the topology may then be updated and distributed to the devices 120.

As described above, the data gathered by the power management devices 120 and processed by the power manager process 132 (and/or 142) can be used to facilitate a variety of intelligent power management schemes. Examples of several such schemes are described in detail in the following sections.

Load Specific Protection Specification

Different machines react differently to power disturbances. In many cases, some makes or models of a particular piece of equipment may be less sensitive to a particular disruption than other machines. Using the information collected about the power environment of a location 110, and the performance characteristics of the loads, the power manager process 132 (and/or 143) can generate load-specific protection specifications for power management devices. For example, a particular piece of equipment, from the reporting data, may be determined to be tolerant of a voltage sag that is well below a nominal specification, e.g., up to 10% below the nominal minimum voltage. Since the equipment is more tolerant to brownouts, the power manager process 132 can generate a profile for the power management device 120 that is protecting the equipment that causes the power management device 120 to maintain power to the equipment even when the input voltage is below a nominal specification, e.g., up to 10% below the nominal specification.

Figure 3:
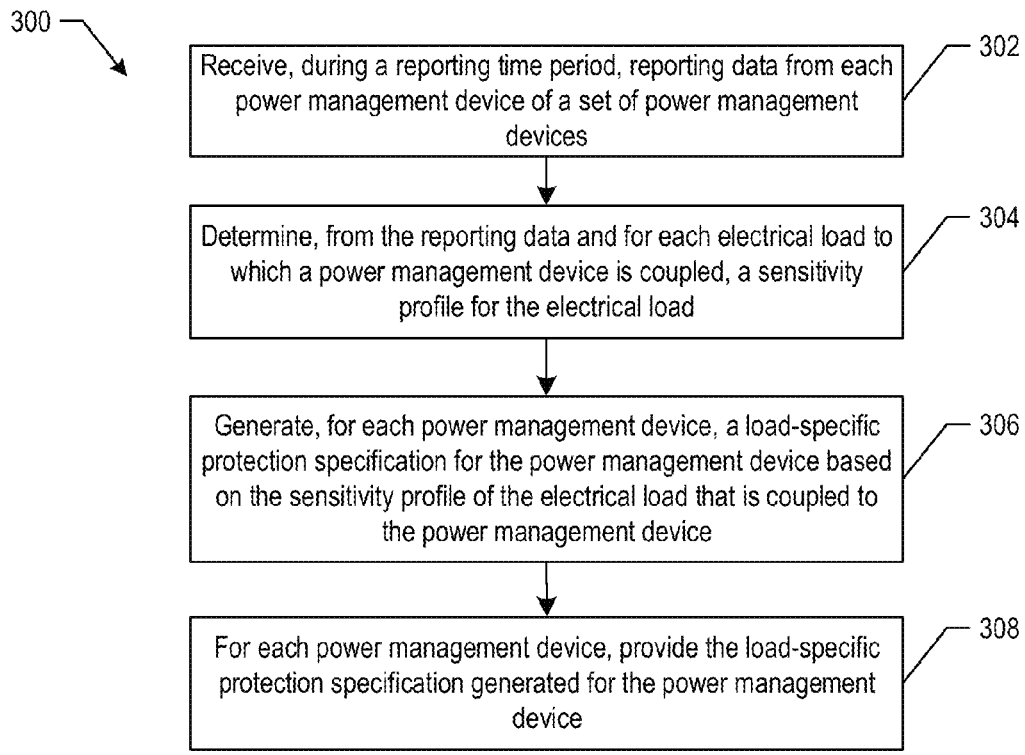
FIG. 3 is a flow diagram of an example process for generating and providing load-specific protection specifications for power management devices.

FIG. 3 is a flow diagram of an example process 300 for generating and providing load-specific protection specifications for power management devices. The process 300 is described with reference to the computer 130, but process steps involving the computer 130 may also be performed by the cloud-based computer 140.

The process 300 receives, during a reporting time period, reporting data from each power management device of a set of power management devices (302). The reporting data includes, for each power management device 120, power characteristics as detected at the electrical load on the distribution branch for the electrical load, and a time at which the power characteristics were detected. The data rate for the reporting data may vary. For example, during normal operation, each device 120 may store reporting data in the memory 204 and only report data every n seconds. However, in response to a disturbance, each device may then report data at a much higher rate, e.g., every n milliseconds, and may also send reporting data for a time period leading up to the disturbance. The computer 130 stores the reporting data in the historical data 134.

In some implementations, the reporting data may also include environmental data, such as temperature and humidity. The environmental data may be provided by the power management devices 120, or may be provided by sensors 116, or by some other source.

The process 300 determines, from the reporting data and for each electrical load to which a power management device is coupled, a sensitivity profile for the electrical load (304). The sensitivity profile for the electrical load characterizes the ability of the electrical load to maintain an operable state in the event of input power to the electrical load deviating from a nominal specification. The power manager 132 can derive the sensitive profile for each load by comparing the power characteristics observed for the load during disturbances. If the characteristics indicate the load maintains a healthy operational state, e.g., the load does not trip, or the load does not draw an inrush that is determined to be excessing during a voltage sag, the power manger process 132 may determine that the load is tolerant of the corresponding disturbances experienced. Alternatively, if the load provides data describing its operational health to the power management device, e.g., by means of a USB connection, for example, the power manager 132 may use such data to derive the sensitivity profile. The sensitivity profile may also take into account the environmental data. One example process for deriving a sensitivity profile is described with reference to FIG. 4 below.

The process 300 generates, for each power management device, a load-specific protection specification for the power management device based on the sensitivity profile of the electrical load that is coupled to the power management device (306). The profile is optimized according to an optimization constraint for the electrical load. For example, assume a standard protection specification causes the power management device 120 to isolate a load if the input voltage is outside of a nominal specification of 120V+/−5V. However, if the optimization constraint is to increase uptime, and the load on the power management device has a sensitivity profile that indicates the load performs well for voltage sags as low as 100V, then the load-specific protection specification may specify that the power management device 120 isolate a load if the input voltage is outside of a range of 100V to 125V.

The process 300, for each power management device, provides the load-specific protection specification generated for the power management device (308). For example, in FIG. 1, each power management device 120 will receive load-specific protection specification particular to each load connected to the device 120. Thus, a power management device 120 with two different loads connected to it may receive two different protection specifications. Thereafter, each power management device 120 will monitor the input power at the electrical load and determine whether the input power is experiencing an input power disturbance that requires, pursuant to the load specific protection specification for the load, a protection action. Thus, depending on the protection specifications, for a particular power disturbance one power management device may determine that an electrical load requires a protection action, and another power management device may determine that an electrical load does not require a protection action.

Figure 4:
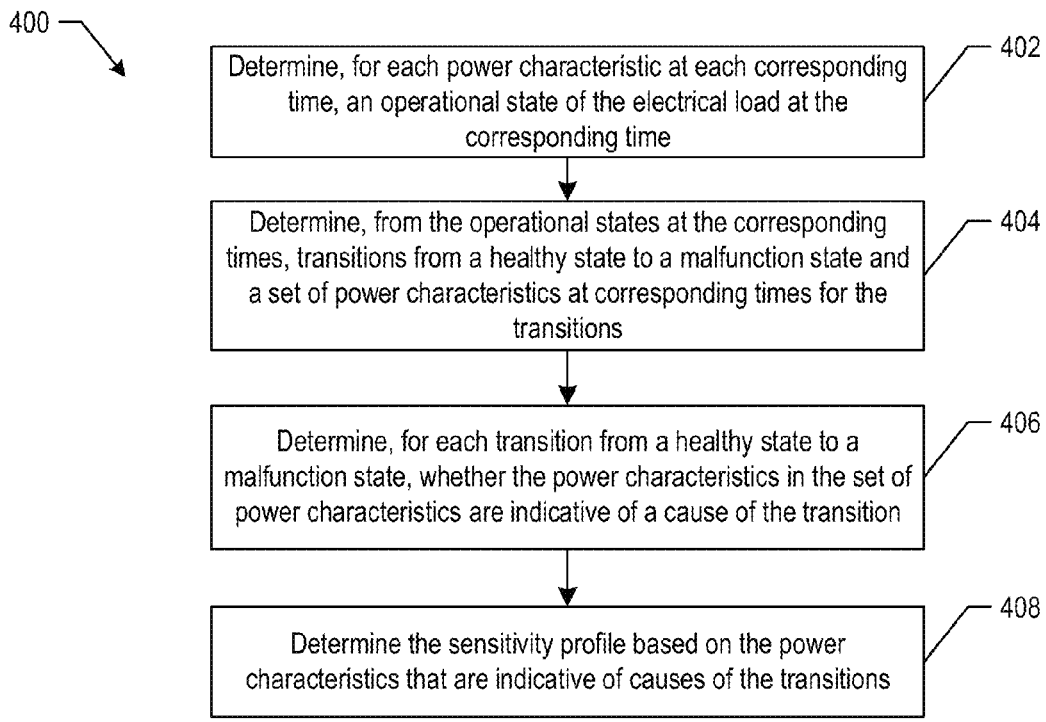
FIG. 4 is a flow diagram of an example process for determining a sensitivity profile for a load on a power management device.

FIG. 4 is a flow diagram of an example process 400 for determining a sensitivity profile for a load on a power management device. The process 400 can be implemented in the power manager process 132, or by the cloud-based power manager process 142.

The process 400 determines, for each power characteristic at each corresponding time, an operational state of the electrical load at the corresponding time (402). The operational states include a healthy state and a malfunction state, and may be determined according to the techniques described above.

The process 400 determines, from the operational sates at the corresponding times, transitions from a healthy state to a malfunction state and a set of power characteristics at corresponding times for the transitions (404). For example, a particular load, according to the reporting data, may have transitions from a healthy state to a malfunction state in response to some disturbances, but may otherwise maintain a healthy state in response to other disturbances. The power manager process 132 may determine, from transition times, the corresponding power characteristics for each transition.

The process 400 determines, for each transition from a healthy state to a malfunction state, whether the power characteristics in the set of power characteristics are indicative of a cause of the transition (406). In the example above, assume that the load begins to experience a large inrush when the input voltage drops below 100V, but otherwise maintains a nominal input current when the voltage is above 100V. Assuming no other data are available, the power manager process 132 would identify an input voltage below 100V as being a cause of the transition.

Now assume that for some transitions certain harmonics were present in the input voltage. The power manager process 132 may initially determine that the harmonics are not the cause of the transition, as they are not present for each transition. The power manager process 132 may further search for the presence of the harmonics at other times, such as when the input voltage is above 100V, and if the harmonics do not positively correlate to the transitions, then the harmonics are not identified as being a cause of the transition.

The process 400 determines the sensitivity profile based on the power characteristics that are indicative of causes of the transitions (408). For example, based on the findings describe above, the power manger process 132 will determine that the load is sensitive to a voltage sag below 100V.

The sensitivity profile may also take into account environmental data, and adjustments may be made based on environmental factors. For example, the power manager process 132 may also determine that when the temperature is over 75 degrees Fahrenheit, the voltage at which a failure occurs increases linearly with the temperature. Accordingly, for temperatures above 75 degrees, the voltage sag limit may increase linearly based on the observed relation.

Consumption Deviation Detection

In addition to remediation during disturbances, detection of potential failures during nominal power conditions can also be performed. For example, the power manager system 132 can detect the energy consumption of electronic equipment during a reporting period. The reporting period is long enough to gather enough data to model typical consumption of the equipment. Thereafter, variances from the model for the equipment can be reported to a responsible party as a possible need for action.

For example, a particular piece of equipment is drawing very little or no energy when its corresponding model indicates the equipment should be drawing a full load. A responsible party can be alerted that the equipment is offline. Conversely, if a particular piece of equipment is drawing significantly more energy than its model indicates it should be drawing, then the equipment may be distressed and nearing a failure. A message can be sent to a responsible party to perform proactive maintenance before an outage at an inopportune time occurs.

Figure 5:
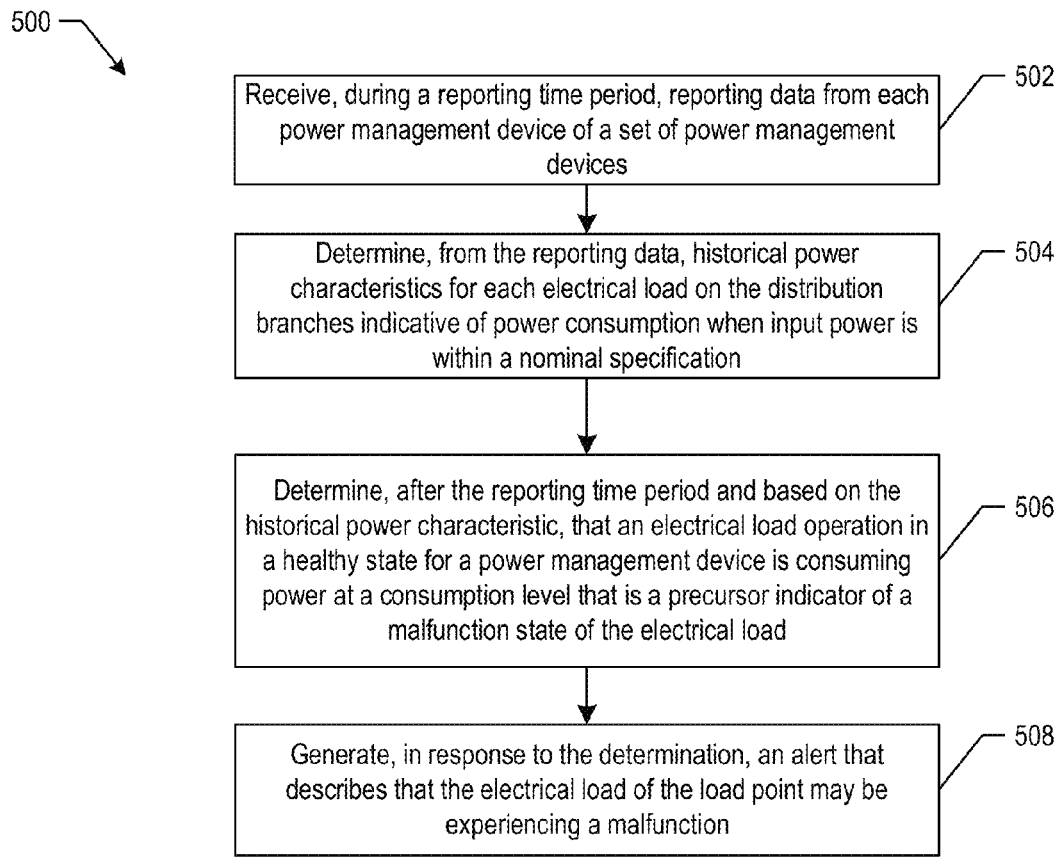
FIG. 5 is a flow diagram of an example process for detecting malfunctions based on precursor indicators.

FIG. 5 is a flow diagram of an example process 500 for detecting malfunctions based on precursor indicators. The process 500 can be implemented in the power manager process 132 (or 142) and the power management devices 120.

The process 500 receives, during a reporting time period, reporting data from each power management device of a set of power management devices (502). As described above, the reporting data includes, for each power management device 120, power characteristics as detected at the electrical load on the distribution branch for the electrical load, and a time at which the power characteristics were detected. Environment data may also be received.

The process 500 determines, from the reporting data, historical power characteristics for each electrical load on the distribution branches indicative of power consumption when input power is within a nominal specification (504). For example, for periods of time when there are no power disturbances, the power consumption for each load 121 connected to a power management device 120 can be modeled. The models may then be distributed to the power management devices 120. Alternatively, the power manager process 132 may retain the models.

The process 500 determines, after the reporting time period and based on the historical power characteristic, that an electrical load operating in a healthy state for a power management device is consuming power at a consumption level that is a precursor indicator of a malfunction state of the electrical load (506). In the case of the models being distributed to each power management device, the decision may be made at each power management device 120. Conversely, if the power manager process 132 retains the models, the power manager model may receive additional reporting data and determine that a particular device is deviating from a normal consumption level. This can be interpreted as a precursor indicator of a malfunction state of the electrical load, or, alternatively, that the electrical load has already malfunctioned.

The process 500 generates, in response to the determination, an alert that describes that the electrical load of the load point may be experiencing a malfunction. (508). For example, power management device 120, or the power manager process 132, may generate a text alert that describes the particular equipment and the power management device to which it is connected, and the particular deviation. The text alert may be sent to a technician to inform the technician that maintenance may be required.

Because a particular piece of equipment may vary its load during certain operations and certain times of day, the power manager process 132 derives a set of tolerance ranges within which the power characteristics are determine to indicate expected consumption. For example, a copier machine may experience inrush during a copy operation, and may also draw extra load during a cooling operation for several minutes after long copy operation. Over time, the performance of load is modeled as tolerance ranges, and as long as the power characteristics indicate the load is within the tolerance ranges when the input power is within a nominal specification, the load is determined to be healthy.

Figure 6:
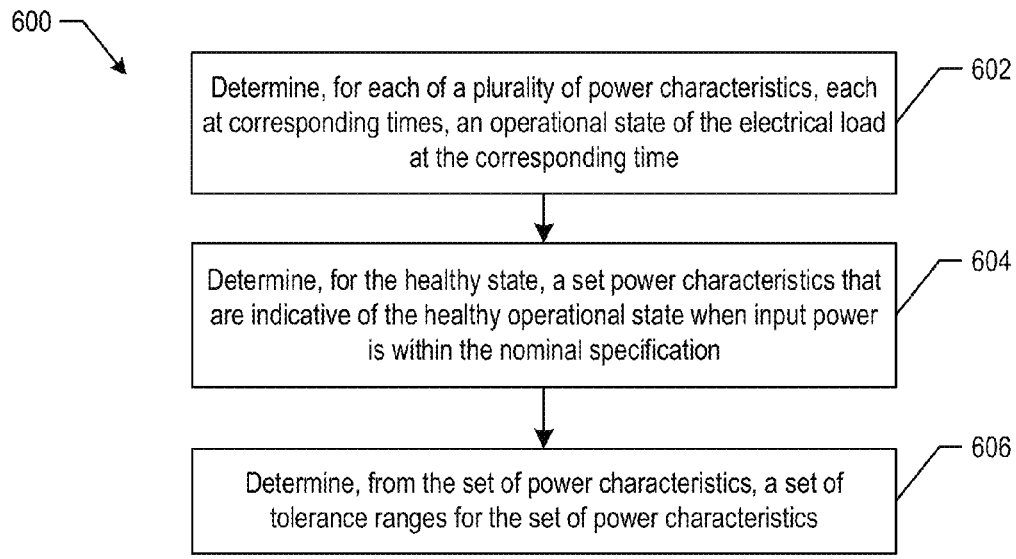
FIG. 6 is a flow diagram of an example process for determining tolerance ranges for detecting malfunctions.

FIG. 6 is a flow diagram of an example process 600 for determining tolerance ranges for detecting malfunctions. The process 600 can be implemented in the power manger process 132 or 142, or within each power management device 120.

The process 600 determines, for each of a plurality of power characteristics, each at corresponding times, an operational state of the electrical load at the corresponding time (602). The operational states include a healthy state and a malfunction state, and may be determined according to the techniques described above.

The process 600 determines, for the healthy state, a set power characteristics that are indicative of the healthy operational state when input power is within the nominal specification (604). For example, with reference to the copier machine, the power manager process 132 may determine a maximum inrush current and a maximum duration for the inrush current based on historical data. The power manager process 132 may also determine that after the inrush, the copy machine typically draws a certain amount of current, e.g., 7 A, and lags the voltage by no more than certain lag amount.

The process 600 determines, from the set of power characteristics, a set of tolerance ranges for the set of power characteristics (606). For example, the power manager process 132 may determine deviations from the values determined above. The deviations may take into account environmental conditions, such as temperature and humidity, and differences in nominal input voltages.

Figure 7:
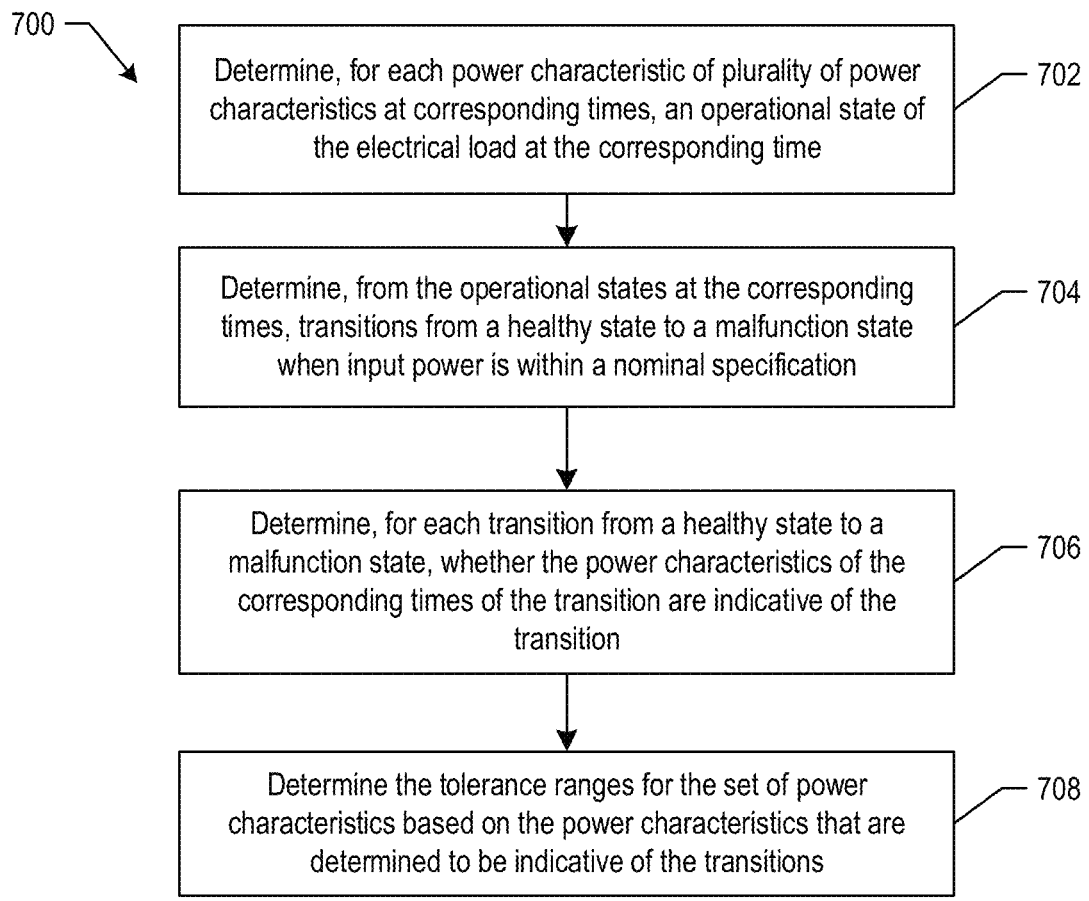
FIG. 7 is a flow diagram of another example process for determining tolerance ranges for detecting malfunctions.

Tolerance ranges may also be determined from observed malfunctions and failures that occur when the input power is within a nominal specification. Because the input power is within the nominal specification, the failures can be attributed to a failure within the failed equipment. The performance of the equipment leading up to the failure can thus be examined to determine tolerance ranges for monitoring. This process is described with reference to FIG. 7, which is a flow diagram of another example process 700 for determining tolerance ranges for detecting malfunctions.

The process 700 determines, for each power characteristic of plurality of power characteristics at corresponding times, an operational state of the electrical load at the corresponding time (702). The operational states include a healthy state and a malfunction state, and may be determined according to the techniques described above.

The process 700 determines, from the operational states at the corresponding times, transitions from a healthy state to a malfunction state when input power is within a nominal specification (704). Because the input power is within the nominal specification, the failures can be attributed to a failure within the failed equipment.

The process 700 determines, for each transition from a healthy state to a malfunction state, whether the power characteristics of the corresponding times of the transition are indicative of the transition (706). The determination of whether the power characteristics of the corresponding times of the transition are indicative of the transition can be made by any appropriate method. For example, assume the data indicates there are four copy machines on a same branch, and thus each receives a same power input. Assume that one of the copy machines failed while power input was within a nominal specification. Power consumption characteristics of the failed copy machine are compared to the power consumption characteristics of the remaining three copy machines that did not fail. The comparison yields, for example, that during a copy operation, the inrush current distribution of the failed copy machine differs from the inrush of the other copy machines in that its peak duration lasts several milliseconds longer than the longest inrush duration of the other copy machines that did not fail, e.g., 12 milliseconds for the machine that failed as compared to 7 milliseconds to the machines that did not fail. Thus, the power manager process 132 may determine that a peak inrush that lasts longer than a maximum peak inrush duration of the other copy machines that did not fail may be a precursor signal for equipment failure.

The process 700 determines the tolerance ranges for the set of power characteristics based on the power characteristics that are determined to be indicative of the transitions (708). For example, based on the above inrush observations, the power manager process 132 may determine that a peak inrush duration of 9 milliseconds or longer may be a signal that is precursor indicator of a malfunction.

Incompatible Load Combination Detection

Some types of equipment that draw significant loads, e.g., vending machines, vacuums, etc., introduce power disturbances into the environment. These disturbances may be in the form of an inrush current, voltage sag, harmonics, and so on. While the equipment may itself be operating normally, it may nevertheless impact other equipment connected to the same branch. By monitoring the power environment on the branch the power manager process 132 can detect when such incompatible load combinations are present. This information can be used to inform a responsible party that action should be taken, and/or adjust the protection specifications of the surrounding power management devices 120.

For example, a vending machine and other office equipment are located on the same branch circuit. The vending machine introduces a voltage sag each time its compressor turns on, negatively impacting the surrounding equipment. The power manager process 132 detect these devices by their characteristic disturbance signatures and issue an alert to a responsible party.

By way of another example, assume a new electronic load is introduced onto a branch. The additional load on the branch causes an increase in sags and brownouts due to the branch's inability to fully handle the added load. Again, the power manager process 132 detect these devices by their characteristic disturbance signatures and issue an alert to a responsible party.

Figure 8:
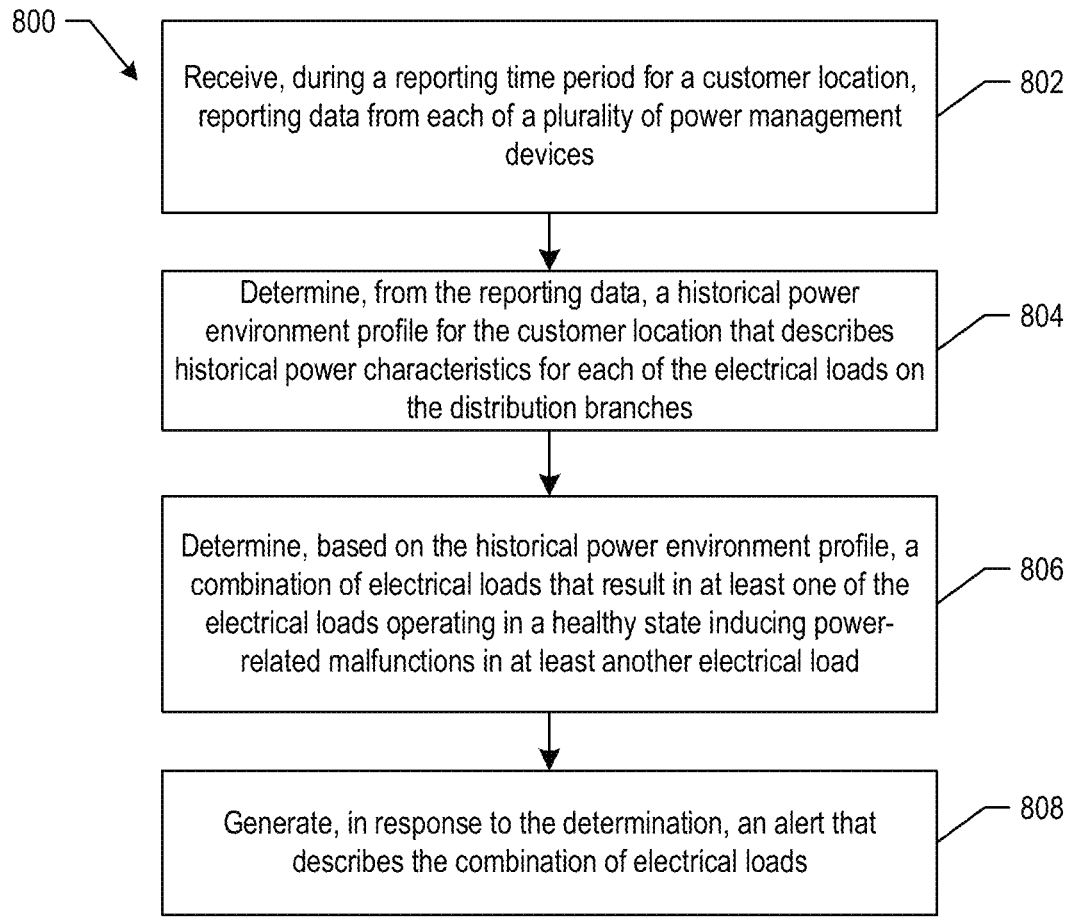
FIG. 8 is a flow diagram of an example process for detecting incompatible load combinations.

FIG. 8 is a flow diagram of an example process 800 for detecting incompatible load combinations. The process 800 can be implemented in the power manger process 132, or by the cloud-based power manager process 142.

The process 800 receives, during a reporting time period for a customer location, reporting data from each of a plurality of power management devices (802). As described above, the reporting data includes, for each power management device 120, power characteristics as detected at the electrical load on the distribution branch for the electrical load, and a time at which the power characteristics were detected. Environment data may also be received.

The process 800 determines, from the reporting data, a historical power environment profile for the customer location that describes historical power characteristics for each of the electrical loads on the distribution branches (804). For example, over a period of time, a number of electrical loads on a particular branch appear to be operating in a consistently healthy state. The electrical loads include servers and lighting. However, at a certain point in time, a copy machine is added to the branch. While the branch has an overall current rating that more than adequately supports the load connected to it, over time several computers begin to experience power-related malfunctions. The reporting data will capture the performance of the loads before and after the addition of the copy machine in the historical power environment profile.

The process 800 determines, based on the historical power environment profile, a combination of electrical loads that result in at least one of the electrical loads operating in a healthy state inducing power-related malfunctions in at least another electrical load (806). For example, based on the data above, the power manager process 132 will determine that the copy machine on the same branch as the computers is causing power-related malfunctions in the computers.

The process 800 generates, in response to the determination, an alert that describes the combination of electrical loads (808). For example, the power manager process 132 may generate a text alert that describes the combination and branch circuit, and that the combination is inducing power-related malfunctions of certain equipment. The alert may be sent to a technician to inform the technician that remediation, e.g., relocating the copy machine to another branch, may be required.

Figure 9:
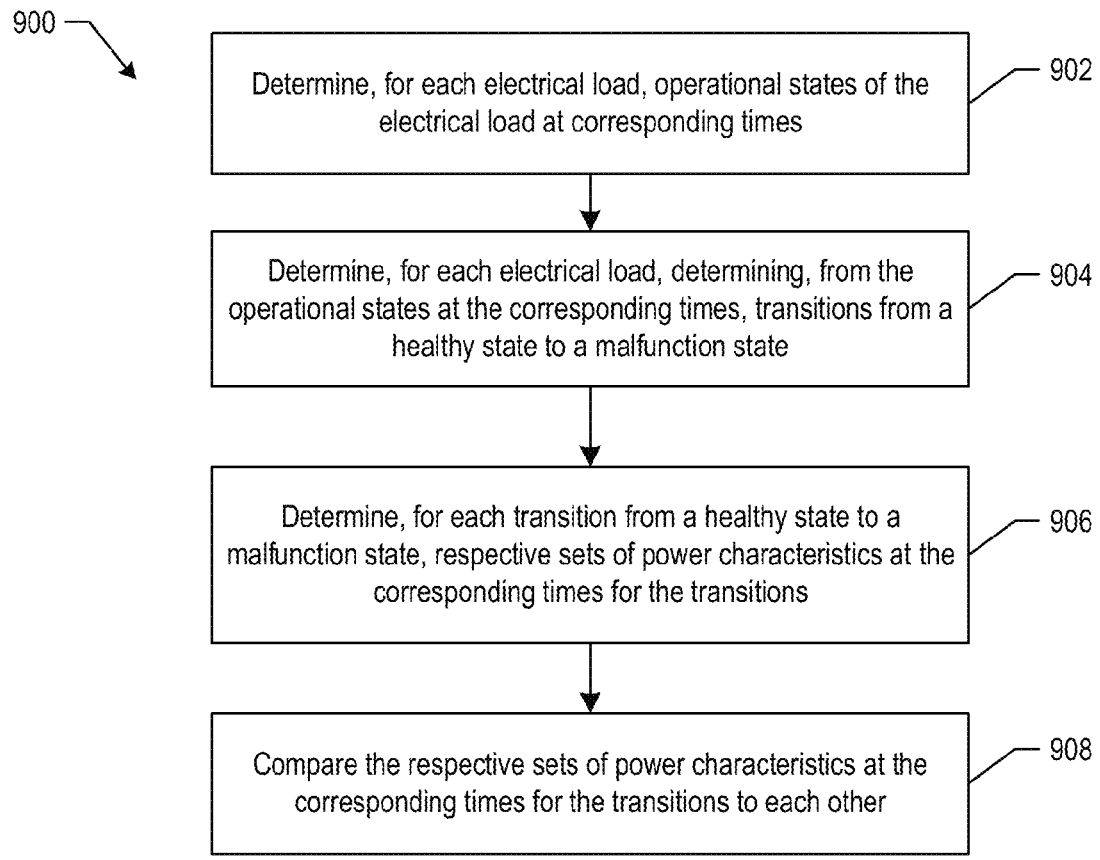
FIG. 9 is a flow diagram of an example process for determining that a first load causes a malfunction in a second load.

FIG. 9 is a flow diagram of an example process 900 for determining that a first load causes a malfunction in a second load. The process 900 can be implemented in the power manger process 132, or by the cloud-based power manager process 142.

The process 900 determines, for each electrical load, operational states of the electrical load at corresponding times (902). The operational states include a healthy state and a malfunction state, and may be determined according to the techniques described above.

The process 900 determines, for each electrical load and from the operational states at the corresponding times, transitions from a healthy state to a malfunction state (904). For example, for each load on a particular branch, the power manager process 132 will identify times, if any, the load transitioned from a healthy state to a malfunction state.

The process 900 determines, for each transition from a healthy state to a malfunction state, respective sets of power characteristics at the corresponding times for the transitions (906). For example, assume that for a particular branch, several computers failed at certain times after the copy machine was added to the branch. For each identified time, the power characteristics of each device on the branch are determined.

The process 900 compares the respective sets of power characteristics at the corresponding times for the transitions to each other (908). Continuing with the above example, assume that the copy machine has a large inrush, and that each failure is coincident with the copy machine drawing a large inrush current. The power manger process 132 will thus determine there is a positive correlation between the inrush on the branch and the failures in the computers. Accordingly, the power manger process 132 may generate an alert detailing the incompatible combination.

Toxic Environment Detection

Power disturbances in a location may not be attributable to any particular combination of equipment, or the combination may not be detectable by the power manager process 132. However, the power manger process 132 can still process historical data 134 and detect when power disturbances are attributable to the electrical loads on the branch, and not due to some external factor. For example, based on historical data, the power manager process 132 may create a baseline "normal" power environment profile, and then monitor for deviations from the baseline. The power manger process 132 may then notify a technician of the detected deviations so that the technician may begin troubleshooting to identify causes of the disturbances.

Figure 10:
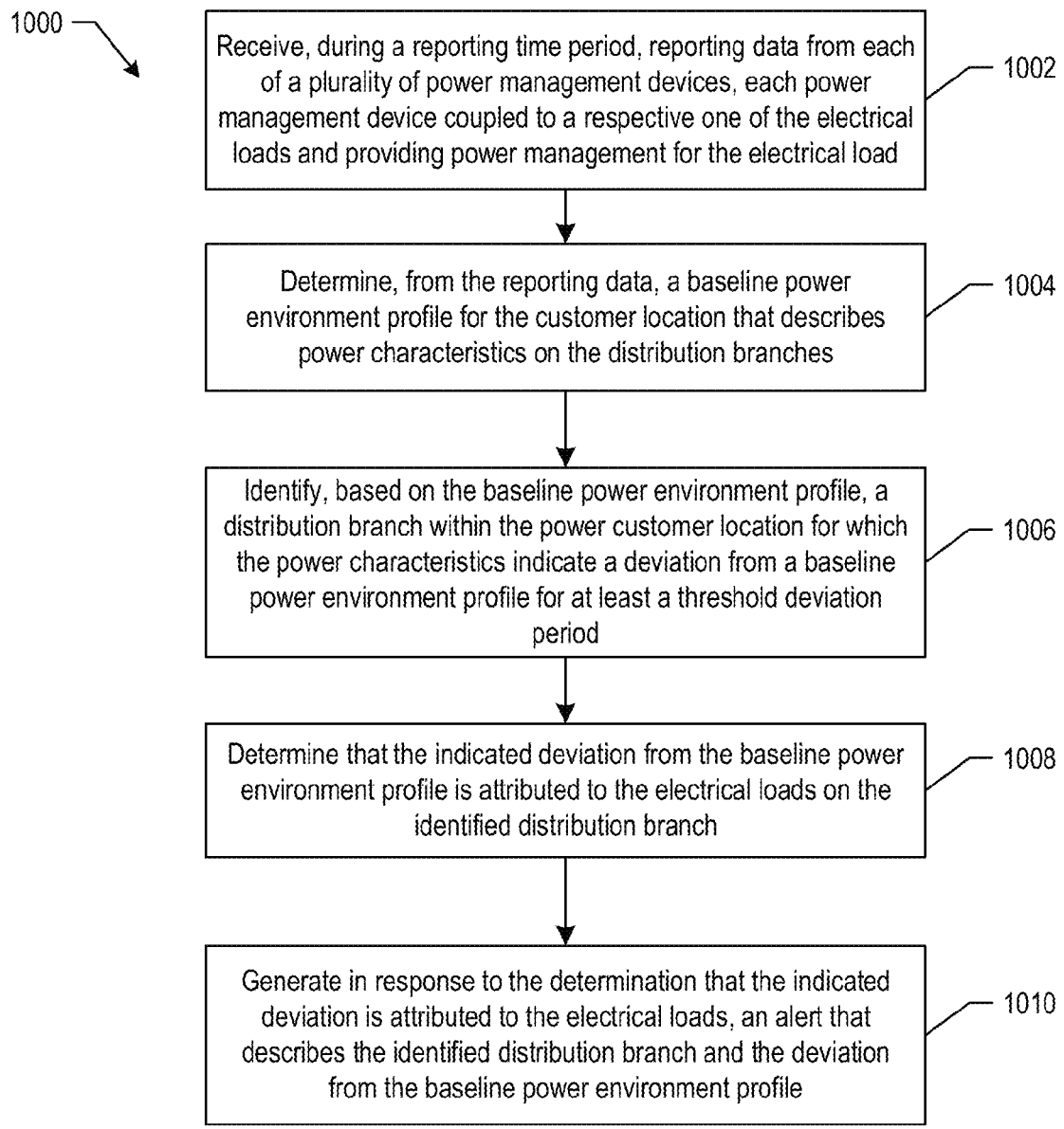
FIG. 10 is a flow diagram of an example process for detecting a toxic power environment within a location.

One example process for detecting toxic environments is described with reference to FIG. 10, which is a flow diagram of an example process 1000 for detecting a toxic power environment within a location. The process 1000 can be implemented in the power manger process 132, or by the cloud-based power manager process 142.

The process 1000 receives, during a reporting time period, reporting data from each of a plurality of power management devices, each power management device coupled to a respective one of the electrical loads and providing power management for the electrical load (1002). As described above, the reporting data includes, for each power management device 120, power characteristics as detected at the electrical load on the distribution branch for the electrical load, and a time at which the power characteristics were detected. Environment data may also be received.

The process 1000 determines, from the reporting data, a baseline power environment profile for the customer location that describes power characteristics on the distribution branches (1004). For example, the baseline power environment profile may include a baseline rate of electrical disturbances for each distribution branch. Each electrical disturbance is a deviation of power as measured on the distribution branch from a nominal specification, e.g., a voltage sag or spike, an over current, etc. The baseline power profile may also include a baseline rate of protective actions taken by power management devices 120 on a distribution branch, and a baseline rate of equipment malfunctions on a branch. Other data can also be recorded in the baseline power environment profile.

The process 1000 identifies, based on the baseline power environment profile, a distribution branch within the power customer location for which the power characteristics indicate a deviation from the baseline power environment profile for at least a threshold deviation period (1006). For example, there power manager process 132 may determine that a distribution branch is beginning to experience electrical disturbances at a rate higher than the electrical disturbance rate in the baseline power environment profile over the period of a workday. Likewise, an increase in protective actions or equipment malfunctions that indicate an increased rate of disturbances may also be detected.

The process 1000 determines that the indicated deviation from the baseline power environment profile is attributed to the electrical loads on the identified distribution branch (1008). For example, the power manager processor 132 may determine that the deviation is attributed to the electrical loads on the identified distribution branch by monitoring deviations on other branches. If the other branches do not exhibit deviations from their respective baseline power environment profiles, then the cause of the disturbance increase is likely isolated to the branch. Likewise, the power manager process 132 may determine whether the power source 102 of the location, e.g., the grid, is the cause of deviation. For example, brown outs reported in the grid, or observed by the power manager process 132, may result in the power manger device 132 not attributing failures in a branch to the loads on the branch.

The process 1000 generates, in response to the determination that the indicated deviation is attributed to the electrical loads, an alert that describes the identified distribution branch and the deviation from the baseline power environment profile (1010). The alert may be routed to a technician for diagnosis and troubleshooting.

Additional Implementation Details

The features described above are not exhaustive and other protection and diagnosis schemes can also be implemented. For example, in the case of a sustained over voltage or brownout, when a particular devices is in a critical state, e.g., in the middle of applying a software update, a sudden loss of power due to a protection process can be detrimental and cause an outage of the equipment. Thus, in some implementations, the power management device 120 can warn the electrical load 121 of a pending outage and allow the load to achieve a state where the outage will not be detrimental. The load can then instruct the device 120 when it can be isolated. Likewise, the load 121 can inform the device 120 that it is in a delicate state and that power should not be cut. Communication between the electrical load 121 operating system and the device 120 can accomplished by APIs or any other appropriate mechanism.

By accessing historical data from multiple different locations, a cloud based power manager process 142 can allow facilities managers to run scenarios to predict power disturbances. For example, a facilities manager may be tasked with installing several copy machines for a tenant on a floor in a building. Using machine learned models generated from the historical data 144, the power manager processor 142 can predict impacts resulting from the addition of the copy machines onto existing branches, and even generate suggested placements of the copy machines within the facility to minimize impacts to existing equipment.

In addition to temperature and humidity, other environment data such as sound levels and motion measurements may be used. For example, a sudden increase in a high pitched noise in a server room, coupled with a slight increase in current draw for a server rack, can be correlated to indicate a failing fan motor.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on tangible computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. Devices suitable for storing computer program instructions and data include all forms of nonvolatile memory, media and memory devices.

To provide for interaction with a user, embodiments of the subject matter described in this specification can be implemented on a computer having a display device for displaying information to the user and a keyboard and a pointing device, e.g., a mouse, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

The computing system can include a user device and servers. A user device and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method implemented in a data processing apparatus, the method comprising:
   for a power customer location that receives power from a power source, the power customer location including a plurality of electrical loads:
      receiving by a data processing apparatus and during a reporting time period, reporting data from each of a plurality of power management devices, each power management device coupled to a respective one of the electrical loads and providing power management for the electrical load;
      wherein for each power management device the reporting data includes:
         power characteristics as detected at the electrical load; and
         a time at which the power characteristics were detected;
      determining, by the data processing apparatus, from the reporting data and for each electrical load to which a power management device is coupled, a sensitivity profile for the electrical load that characterizes the ability of the electrical load to maintain a healthy state in the event of input power to the electrical load deviating from a nominal specification, the determining comprising:
         determining, for each of a plurality of power characteristics, each at corresponding times, an operational state of the electrical load at the corresponding time, wherein the operational states include a healthy state during which the electrical load is not experiencing a malfunction, and a malfunction state during which the electrical load is experiencing a malfunction;
         determining from the operational states at the corresponding times, transitions from a healthy state to a malfunction state and a set of power characteristics at corresponding times for the transitions, the corresponding times for each transition including corresponding times before the transition and corresponding times after the transition;
         determining, for each transition from a healthy state to a malfunction state, whether the power characteristics in the set of power characteristics are indicative of a cause of the transition; and
         determining the sensitivity profile based on the power characteristics that are indicative of causes of the transitions; and
      generating, by the data processing apparatus, for each power management device of two or more power management devices, a load-specific protection specification for the power management device based on the sensitivity profile of the electrical load that is coupled to the power management device, wherein the load-specific protection specification is different from a load-specific protection specification for another power management device.

2. The computer-implemented method of claim 1, wherein for each electrical load the load-specific protection specification is optimized according to an optimization constraint for the electrical load.

3. The computer-implemented method of claim 1, further comprising providing, by data communication, the load-specific protection specifications to the respective power management devices.

4. The computer-implemented method of claim 1, further comprising:
receiving, at each of a plurality of power management devices, a load-specific protection specification that is specific to the electrical load coupled to the power management device;
at each of the plurality of power management devices:
monitoring the input power at the electrical load; and
determining whether the input power is experiencing an input power disturbance that requires, pursuant to the load specific protection specification of the power management device, a protection action for the electrical load;
wherein for a particular input power disturbance at least one power management device determines that an electrical load requires a protection action and at least one other power management device determines that an electrical load does not require a protection action.

5. The computer-implemented method of claim 1, wherein generating, for each power management device of two or more power management devices, the load-specific protection specification for the power management device based on the sensitivity profile and that is optimized according to an optimization constraint comprises generating the load-specific protection specification that species the electrical load be isolated when a deviation of a power characteristic of the input power is greater than a power characteristic of the input power that has been determined to a cause of a transition from a healthy state to a malfunction state.

6. The computer-implemented method of claim 1, wherein the power characteristics describe one or more voltage and current conditions for the electrical load.

7. The computer-implemented method of claim 1, wherein the power characteristics describe one or more environmental conditions for the electrical load.

8. The computer-implemented method of claim 7, wherein the environmental conditions describe one or more of temperature and humidity for the electrical load.

9. A non-transitory computer readable medium storing instructions executable by a data processing apparatus and that upon such execution cause the data processing apparatus to perform operations comprising:
for a power customer location that receives power from a power source, the power customer location including a plurality of electrical loads:
receiving by a data processing apparatus and during a reporting time period, reporting data from each of a plurality of power management devices, each power management device coupled to a respective one of the electrical loads and providing power management for the electrical load;
wherein for each power management device the reporting data includes:
power characteristics as detected at the electrical load; and
a time at which the power characteristics were detected;
determining, by the data processing apparatus, from the reporting data and for each electrical load to which a power management device is coupled, a sensitivity profile for the electrical load that characterizes the ability of the electrical load to maintain a healthy state in the event of input power to the electrical load deviating from a nominal specification, the determining comprising:
determining, for each of a plurality of power characteristics, each at corresponding times, an operational state of the electrical load at the corresponding time, wherein the operational states include a healthy state during which the electrical load is not experiencing a malfunction, and a malfunction state during which the electrical load is experiencing a malfunction;
determining from the operational states at the corresponding times, transitions from a healthy state to a malfunction state and a set of power characteristics at corresponding times for the transitions, the corresponding times for each transition including corresponding times before the transition and corresponding times after the transition;
determining, for each transition from a healthy state to a malfunction state, whether the power characteristics in the set of power characteristics are indicative of a cause of the transition; and
determining the sensitivity profile based on the power characteristics that are indicative of causes of the transitions; and
generating, by the data processing apparatus, for each power management device of two or more power management devices, a load-specific protection specification for the power management device based on the sensitivity profile of the electrical load that is coupled to the power management device, wherein the load-specific protection specification is different from a load-specific protection specification for anther power management device.

10. A system, comprising:
a data processing apparatus; and
a non-transitory computer readable medium storing instructions executable by the data processing apparatus and that upon such execution cause the data processing apparatus to perform operations comprising:
for a power customer location that receives power from a power source, the power customer location including a plurality of electrical loads:
receiving by a data processing apparatus and during a reporting time period, reporting data from each of a plurality of power management devices, each power management device coupled to a respective one of the electrical loads and providing power management for the electrical load;
wherein for each power management device the reporting data includes:
power characteristics as detected at the electrical load; and
a time at which the power characteristics were detected;
determining, by the data processing apparatus, from the reporting data and for each electrical load to which a power management device is coupled, a sensitivity profile for the electrical load that characterizes the ability of the electrical load to maintain a healthy state in the event of input power to the electrical load deviating from a nominal specification, the determining comprising:
determining, for each of a plurality of power characteristics, each at corresponding times, an operational state of the electrical load at the corresponding time, wherein the operational states include a healthy state during which the electrical load is not experiencing a malfunction, and a malfunction state during which the electrical load is experiencing a malfunction;

determining from the operational states at the corresponding times, transitions from a healthy state to a malfunction state and a set of power characteristics at corresponding times for the transitions, the corresponding times for each transition including corresponding times before the transition and corresponding times after the transition;

determining, for each transition from a healthy state to a malfunction state, whether the power characteristics in the set of power characteristics are indicative of a cause of the transition; and determining the sensitivity profile based on the power characteristics that are indicative of causes of the transitions; and generating, by the data processing apparatus, for each power management device of two or more power management devices, a load-specific protection specification for the power management device based on the sensitivity profile of the electrical load that is coupled to the power management device, wherein the load-specific protection specification is different from a load-specific protection specification for anther power management device.

11. The system of claim 10, wherein for each electrical load the load-specific protection specification is optimized according to an optimization constraint for the electrical load.

12. The system of claim 10, the operations further comprising providing, by data communication, the load-specific protection specifications to the respective power management devices.

13. The system of claim 10, the operation further comprising:

receiving, at each of a plurality of power management devices, a load-specific protection specification that is specific to the electrical load coupled to the power management device;

at each of the plurality of power management devices:

monitoring the input power at the electrical load; and determining whether the input power is experiencing an input power disturbance that requires, pursuant to the load specific protection specification of the power management device, a protection action for the electrical load;

wherein for a particular input power disturbance at least one power management device determines that an electrical load requires a protection action and at least one other power management device determines that an electrical load does not require a protection action.

14. The system of claim 13, wherein generating, for each power management device of two or more power management devices, the load-specific protection specification for the power management device based on the sensitivity profile and that is optimized according to an optimization constraint comprises generating the load-specific protection specification that results in an increase in time that the operational load is operating in a healthy state.

15. The system of claim 13, wherein generating, for each power management device of two or more power management devices, the load-specific protection specification for the power management device based on the sensitivity profile and that is optimized according to an optimization constraint comprises generating the load-specific protection specification that results in a decrease in protection actions in response to the input power deviating from the nominal specification to power characteristics that are not determined to be a cause of a transition from a healthy state to a malfunction state.

16. The system of claim 13, wherein the power characteristics describe one or more voltage and current conditions for the electrical load.

* * * * *